Figure 1:
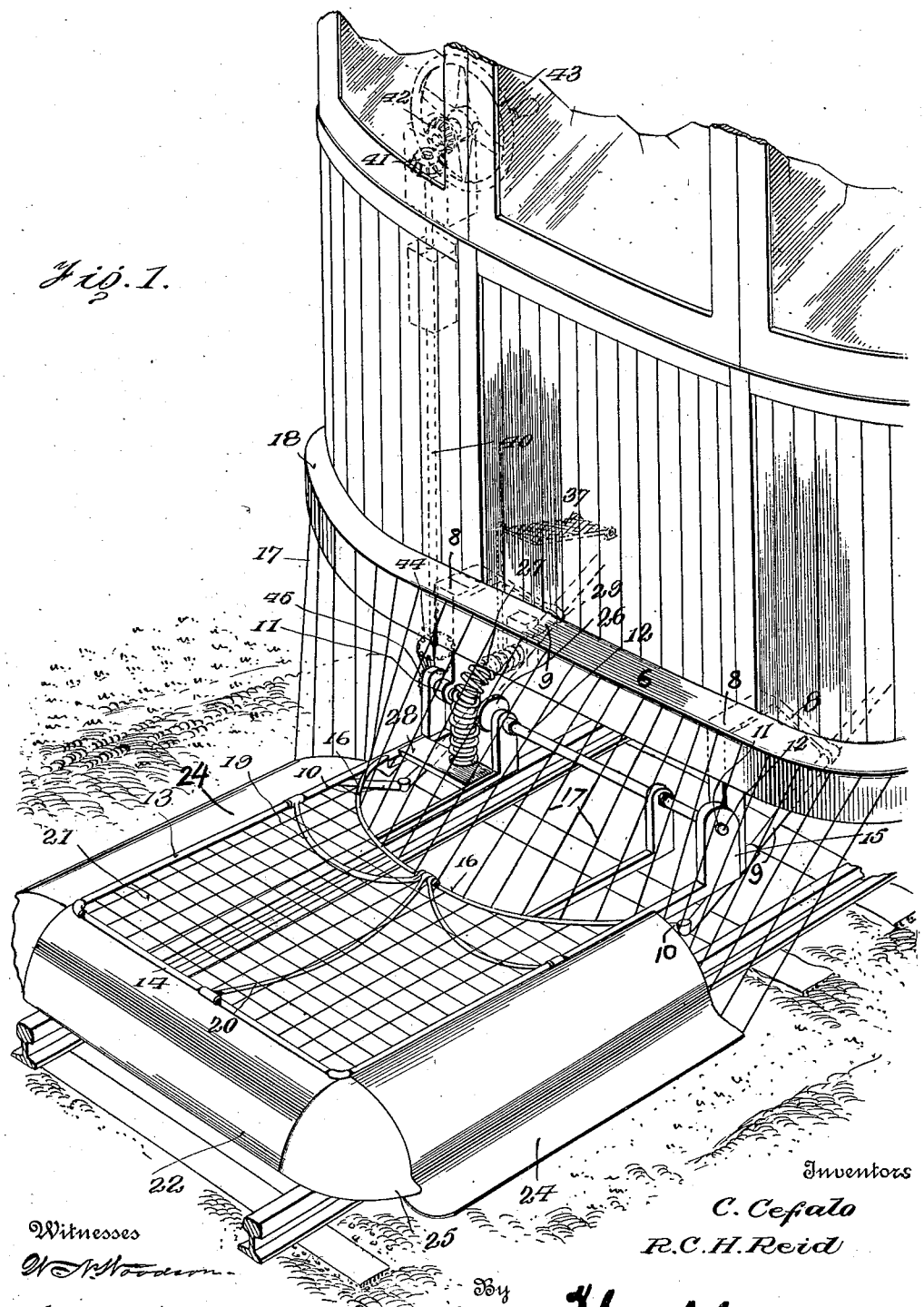

C. CEFALO & R. C. H. REID.
FENDER.
APPLICATION FILED JUNE 28, 1910.

1,026,655.

Patented May 21, 1912.

3 SHEETS—SHEET 1.

Witnesses

Inventors
C. Cefalo
R.C.H. Reid

By

Attorneys

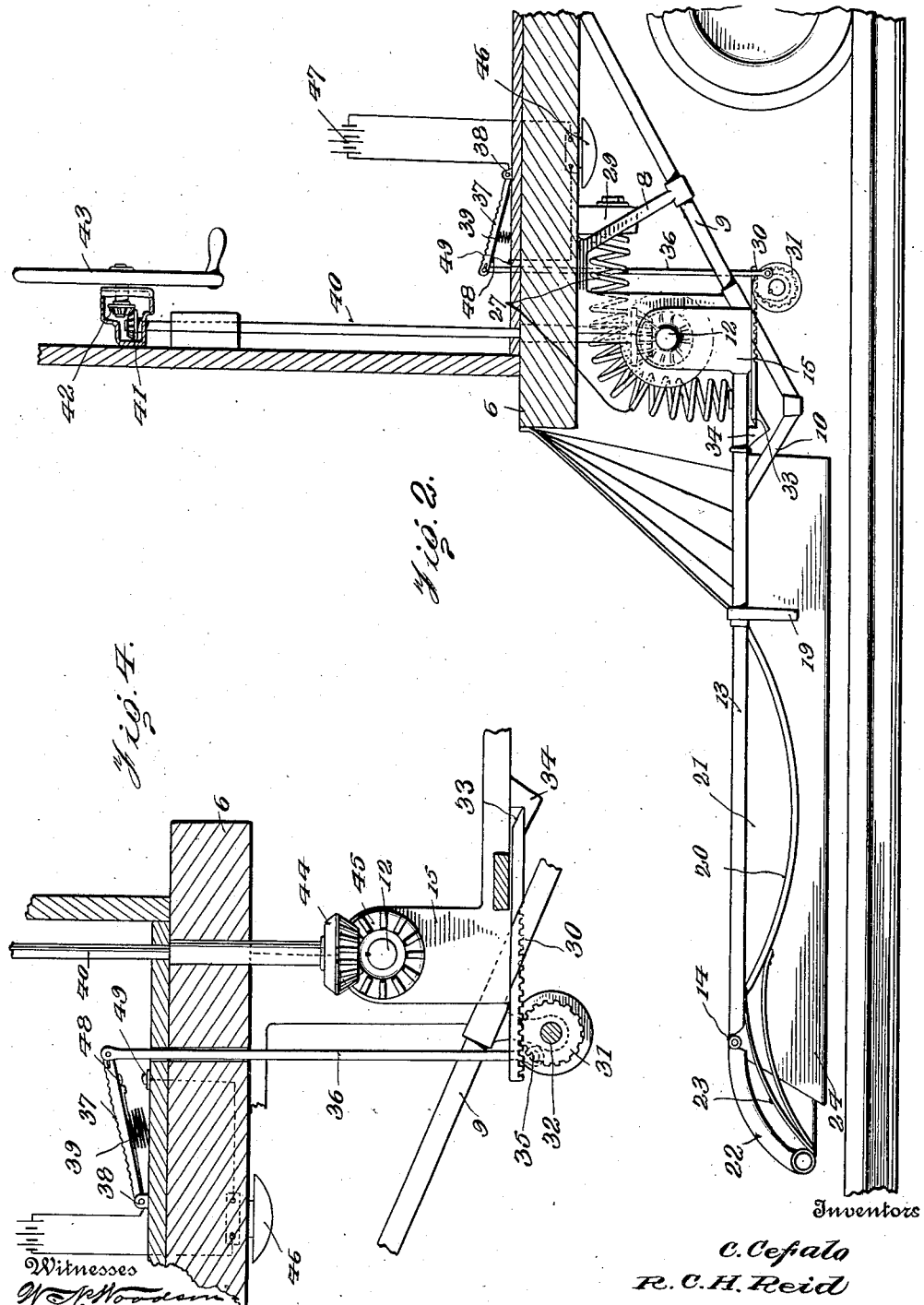

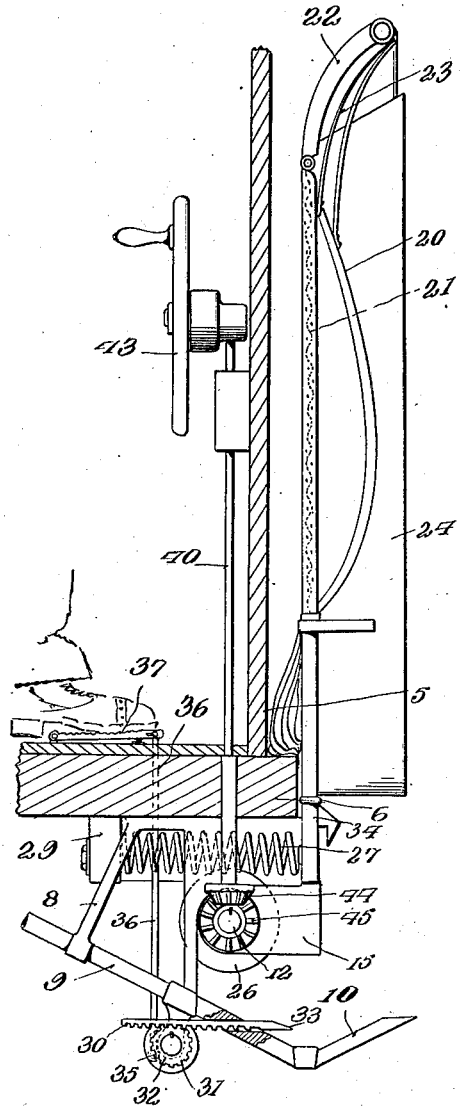

UNITED STATES PATENT OFFICE.

CIRIACO CEFALO AND ROBERT C. H. REID, OF BANGOR, MAINE.

FENDER.

1,026,655.

Specification of Letters Patent.

Patented May 21, 1912.

Application filed June 28, 1910. Serial No. 569,394.

*To all whom it may concern:*

Be it known that we, CIRIACO CEFALO and ROBERT C. H. REID, citizens of the United States, residing at Bangor, in the county of Penobscot and State of Maine, have invented certain new and useful Improvements in Fenders, of which the following is a specification.

This invention relates to fenders for surface cars and other vehicles, and has for its object the provision of a strong, durable and thoroughly efficient device of this character, the construction of which is such as effectively to prevent a person walking or standing in the path of travel of the vehicle from being thrown beneath the wheels thereof and maimed or otherwise injured.

A further object is to provide a fender including a frame having its rear end pivotally connected with a vehicle, and its front portion provided with a yieldably supported apron so as to prevent injury to a person coming in contact therewith.

A further object is to provide means for automatically elevating the front end of the fender, means for retarding the downward movement of said fender, and means for locking the fender in lowered or operative position.

A further object is to provide means for sounding an alarm when the fender is elevated.

A still further object is generally to improve this class of devices so as to increase their durability and efficiency.

Further objects and changes will appear in the following description, it being understood that various changes in the form, proportion and minor details of construction may be resorted to within the scope of the appended claims.

For a full understanding of the invention and the merits thereof, and also to acquire a knowledge of the details of construction and a means for effecting the result, reference is to be had to the following description and the accompanying drawings in which:—

Figure 1 is a perspective view of a street car provided with a fender constructed in accordance with our invention. Fig. 2 is a side elevation, showing the fender in lowered or operative position, one of the side aprons being removed in order to more clearly show the construction of the fender, and the body of the car and casing for the gearing of the hand wheel being shown in section; Fig. 3 is a side elevation, showing the fender in elevated or inoperative position, one of the side aprons being removed and the body of the car and one of the supporting arms shown in section; Fig. 4 is a detail sectional view showing the construction of the locking mechanism.

The improved fender forming the subject-matter of the present invention may be used in connection with street cars, automobiles and other vehicles, and by way of illustration is shown applied to a surface car of the ordinary construction in which 5 designates the body of the car and 6 the platform.

The device comprises spaced supporting brackets 8 depending from the front of the car and provided at their lower ends with inclined braces 9, the upper ends of which are secured in any suitable manner to the car beneath the platform 6, while the lower ends thereof are bent forwardly and upwardly to form supporting arms 10. The brackets 8 are provided with transversely alined eyes 11 forming bearings for a shaft or rod 12, on which is pivotally mounted for tilting movement the fender proper.

The fender comprises a substantially rectangular frame including spaced side bars 13 connected at their forward ends by a front bar 14. The rear ends of the side bars 13 are thickened and extend upwardly to provide vertically disposed ears 15 having openings formed therein to permit the passage of the rod 12, said rod forming the pivotal axis of the fender as shown.

The rear ends of the side bars 13 are connected by an outwardly curved bar 16 to which is secured in any suitable manner the adjacent edge of a strip of netting 17 for connection with the bumper 18 of the car, thus to prevent a person striking the fender and being thrown beneath the wheels of the vehicle. The fender is reinforced and strengthened by the provision of transversely dished braces 19 and a longitudinally dished brace 20, said braces being secured to the bars 13 and 14 respectively and having their adjacent ends united and rigidly secured to the curved bar 16, as best shown in Fig. 1 of the drawings. A strip of netting 21 forms a closure for the top of the fender, said netting being normally taut and spaced from the bars 19 and 20, so that when a heavy body is deposited thereon the net will sink and thus produce in effect a pocket. Pivotally mounted on the bar 14 of the fender frame is a downwardly curved apron 22, the upper surface of which may be covered with felt or other yieldable material so as to prevent injury to a person coming in contact therewith. The front apron 22 is normally and yieldably supported above the car tracks by one or more springs 23, which latter are secured in any suitable manner to the side bars 13 and dished bar 20 with their lower ends bearing against the free end of the apron 22 so as to permit said apron to swing downwardly by contact with a person and thus form in effect a scoop for directing the body into the pockets formed by the netting 21. Rigidly secured to the longitudinal bars 13 of the fender are side aprons 24, there being corner aprons 25 preferably formed integral with the front apron 22 and overlapping the side aprons 24 so as to allow free pivotal movement of said front apron.

The rigid side aprons 24 are preferably used on suburban cars where the rails are set up on sleepers, but if desired yieldably supported aprons similar in construction to the front apron 22 may be employed on opposite sides of the fender instead of the rigid aprons. Mounted on the rod or shaft 12 is a grooved wheel 26 over which passes the intermediate portion of a coiled spring 27, one end of said spring being secured to a transverse plate 28 carried by the fender, and the other end thereof being secured in any suitable manner to an anchoring lug 29 depending from the bottom of the car, the function of the spring being to automatically elevate the fender when it is desired to couple the car to an adjacent car, or to arrange several of said cars in a barn or other inclosure. As a means for holding the fender in lowered or operative position, there is provided a rack bar 30, the teeth of which engage a cog wheel 31 journaled in a suitable bearing 32 depending from one of the inclined braces 9. The rack bar 30 extends through a guiding recess formed in the brace 9 and is provided with an inclined terminal 33 adapted to engage a catch 34 depending from one of the side bars 13 of the fender.

Pivotally mounted on a crank pin 35 extending laterally from the cog wheel 31, is one end of a rod 36, the opposite end of which extends through an opening in the platform 6 for pivotal connection with a foot lever or treadle 37. The foot lever 37 is pivotally mounted at 38 on the platform of the car, and the free end thereof is normally held in elevated position by a coil spring 39 interposed between the lever and the platform of the car, as best shown in Fig. 4 of the drawing, the tension of the spring 38 being such as to normally hold the inclined or active end of the rack bar 30 in the path of movement of the catch 34. Thus it will be seen that by depressing the foot lever 37 the cog wheel 31 will be partially rotated to withdraw the rack 30 from engagement with the catch 34, thus permitting the spring 27 to automatically move the fender to elevated or inoperative position at the front of the car. When the foot is removed from the lever 37 the spring 38 will exert an upward pull on the rod 36 and actuate the gear wheel 31 to move the inclined end of the rack bar 33 in the path of the catch 34 when the fender has been lowered.

In order to retard the downward movement of the fender and thus prevent injury thereto when the fender is lowered, there is provided a vertically disposed shaft 40 journaled in suitable bearings on the dashboard of the car and having its upper end provided with a beveled pinion 41 which meshes with a correspondingly beveled pinion 42 carried by a hand wheel 43. The lower end of the rod 40 extends through an opening in the platform 6 and is provided with a beveled gear 44 which meshes with a beveled gear 45, the teeth of which are formed in one of the upstanding ears 15 of the fender so that by rotating the hand wheel 43 the fender may be gradually lowered to operative position.

A bell or other audible signal 46 is preferably secured to the bottom of the car and connected in circuit with a battery 47, one terminal of the circuit being connected with a contact 48 on the foot lever 37, and the other terminal thereof being connected with a contact 49 on the platform of the car so that when the foot lever 37 is depressed to elevate the fender, the circuit will be closed through the contacts 48 and 49 thus to sound an alarm and notify the driver of a passing team that the fender is to be elevated. If desired, however, the battery 47 may be dispensed with and the bell or alarm 46 connected in circuit with the overhead conductor, or controller. The netting 17 also preferably extends from the bumper to the lower edges of the side aprons 24, although this netting may terminate at the upper or fixed edges of the side aprons if found desirable.

Under ordinary conditions the fender is retained in lowered position by means of the catch 34. When it is desired to elevate the fender the foot lever is depressed which withdraws the rack bar 30 from the catch 34 and causes the spring 27 to elevate the fender to the position shown in Fig. 3 of the drawings. When the hand wheel 43 is rotated the fender will be lowered, the catch 34 coming in contact with the active end of the rack bar 30 and automatically locking the fender in lowered or operative position, as before stated. The fenders may be made in different sizes, and shapes, and used on cars, automobiles and other vehicles without departing from the spirit of the invention.

What is claimed is:

1. The combination with a vehicle, of a fender pivotally mounted on the vehicle, a catch carried by the fender, a rack bar engaging the catch for normally holding the fender in lowered position, means for releasing the rack bar from engagement with the catch, and means for automatically elevating the free end of the fender when said rack bar is released.

2. The combination with a vehicle, of a fender pivotally mounted on the vehicle, means for locking the fender in lowered position, means for releasing the locking means, means for swinging the entire fender on its pivotal axis to a substantially vertical position when the locking means is released, and manually controlled means for retarding the downward movement of the fender when said fender is returned from its elevated position to its normal position.

3. The combination with a vehicle, of a fender pivotally mounted on the vehicle, a catch carried by the fender, a pinion, a rack bar meshing with the pinion and adapted to engage the catch for holding the fender in lowered position, means for rotating the pinion to release the rack bar from the catch, and manually controlled means for automatically elevating the front end of the fender when the locking means is released.

4. The combination with a vehicle, of a fender pivotally mounted on the vehicle, a catch carried by the fender, a pinion, a rack bar meshing with the pinion and adapted to engage the catch for holding the fender in lowered position, a foot lever, a connection between the foot lever and pinion for rotating the latter to release the rack bar from the catch, and means for automatically elevating the front end of the fender when the locking means is released.

5. The combination with a vehicle, of a fender pivotally mounted on the vehicle and provided with front and side aprons, one of which is yieldably supported on said fender, means for locking the fender in lowered position, means for releasing the locking means, means for elevating the free end of the fender when the locking means is released, and manually controlled means for retarding the downward movement of the fender when the latter is returned to lowered position.

6. The combination with a vehicle, of a fender pivotally connected with the vehicle and including a frame having longitudinal and transverse reinforcing bars, a strip of netting forming a closure for the top of the fender and resting on said bars, side aprons secured to the frame of the fender, a front apron pivotally connected with said frame, springs forming a connection between the frame of the fender and the lower edge of the front apron, means for locking the fender in lowered position, and means for automatically elevating the free end of the fender when the locking means is released.

7. The combination with a vehicle, of spaced supporting brackets depending from the vehicle, a rod connecting said brackets, a fender pivotally mounted on the rod and provided with upstanding ears, one of which is provided with a gear wheel, means for locking the fender in lowered position, means for automatically elevating the free end of the fender when the locking means is released, and a rod having a beveled pinion meshing with the gear wheel on the adjacent ear of the fender for retarding the downward movement of the fender when the rod is rotated.

8. The combination with a vehicle, of spaced brackets depending from the vehicle and provided with supporting arms, a rod carried by the brackets, a fender pivotally mounted on the rod and bearing against the supporting arms when the fender is in lowered position, a spring forming a connection between the fender and vehicle, and means for locking the fender in lowered position.

9. The combination with a vehicle, brackets depending from the bottom of the vehicle and provided with inclined braces terminating in upwardly extending supporting arms, a rod connecting the brackets, a fender pivotally mounted on the rod and normally resting on the supporting arms, means for locking the fender in lowered position, a spring forming a connection between the fender and bottom of the car for automatically elevating the free end of the fender when the locking means is released, and manually controlled means operatively connected with the fender for retarding the downward movement thereof when the fender is lowered.

10. The combination with a vehicle, of spaced brackets depending from the bottom of the vehicle, a rod connecting said brackets, a grooved roller secured to the rod, a fender including a frame having upstanding ears journaled on said rod, one of said ears being provided with teeth constituting a beveled gear, means for locking the fender in lowered position, a coiled spring having one end thereof secured to the fender and its other end passing over the grooved pulley and engaging the vehicle for automatically elevating the free end of the fender when the locking means is released, and a rod journaled on the car and provided with a beveled pinion engaging the beveled pinion on the adjacent upstanding ear of the fender for retarding the downward movement of the fender when the rod is rotated.

11. The combination with a vehicle, of a fender pivotally mounted on the vehicle, a catch carried by the fender, a pinion, a rack bar meshing with the teeth on the pinion and adapted to engage the catch for locking the fender in lowered position, a foot lever operatively connected with the pinion for actuating the latter to release the rack bar from the catch, means for automatically elevating the free end of the fender when the locking means is released, and a spring for normally holding the free end of the foot lever in elevated position.

12. The combination with a vehicle, of spaced brackets depending from the bottom of the vehicle, a rod connecting said brackets and provided with a grooved roller, a fender pivotally mounted on the rod and including a substantially rectangular frame, an outwardly curved bar forming a part of the frame, front and side aprons carried by the frame, a strip of netting forming a closure for the top of the fender, a strip of netting forming a connection between the curved bar of the fender frame and the front of the vehicle, means for locking the fender in lowered position, means for automatically elevating the free end of the fender when the locking means is released, and manually controlled means operatively connected with the fender for retarding the downward movement thereof when the fender is lowered.

In testimony whereof, we affix our signatures in presence of two witnesses.

CIRIACO CEFALO. [L. S.]
ROBERT C. H. REID. [L. S.]

Witnesses:
JENNIE LOFTUS,
CHARLES H. REID, Jr.

Copies of this patent may be obtained for five cents each, by addressing the "Commissioner of Patents, Washington, D. C."